US007730066B2

(12) United States Patent
Bonham et al.

(10) Patent No.: US 7,730,066 B2
(45) Date of Patent: Jun. 1, 2010

(54) METHODS, APPARATUS AND COMPUTER PROGRAM PRODUCTS FOR PROCESSING CLAIMS

(75) Inventors: David L. Bonham, Tallahassee, FL (US); Anil Kumar, Tallahassee, FL (US); Richard J. Runkel, Punta Gorda, FL (US); Jamison M. Stamps, Tallahassee, FL (US); Amanda Starr, Crawfordville, FL (US)

(73) Assignee: Affiliated Computer Services, Inc., Dallas, TX (US)

(*) Notice: Subject to any disclaimer, the term of this patent is extended or adjusted under 35 U.S.C. 154(b) by 416 days.

(21) Appl. No.: 10/933,864

(22) Filed: Sep. 3, 2004

(65) Prior Publication Data
US 2006/0053093 A1 Mar. 9, 2006

(51) Int. Cl.
*G06F 7/00* (2006.01)
(52) U.S. Cl. .............................. 707/737; 707/769; 705/2
(58) Field of Classification Search ...................... 705/2, 705/3; 358/3.23; 707/999.003, 737, 769
See application file for complete search history.

(56) References Cited

U.S. PATENT DOCUMENTS

| 5,079,714 | A | * | 1/1992 | Manduley et al. ............. 705/30 |
| 5,307,262 | A | * | 4/1994 | Ertel ............................. 705/2 |
| 6,341,265 | B1 | | 1/2002 | Provost et al. |
| 6,343,271 | B1 | | 1/2002 | Peterson et al. |
| 6,938,206 | B2 | * | 8/2005 | Ingle et al. ..................... 707/10 |
| 6,999,204 | B2 | * | 2/2006 | Mortenson et al. .......... 358/3.23 |
| 2001/0027403 | A1 | * | 10/2001 | Peterson et al. ................. 705/4 |
| 2002/0169955 | A1 | | 11/2002 | Bryant, Jr. et al. |
| 2003/0149594 | A1 | | 8/2003 | Beazley et al. |
| 2003/0191665 | A1 | | 10/2003 | Fitzgerald et al. |
| 2003/0229516 | A1 | * | 12/2003 | Nickerson ....................... 705/2 |
| 2004/0010422 | A1 | * | 1/2004 | Michalski et al. ............... 705/2 |
| 2004/0133452 | A1 | | 7/2004 | Denny, Jr. et al. |

* cited by examiner

*Primary Examiner*—Hosain T Alam
*Assistant Examiner*—Jieying Tang
(74) *Attorney, Agent, or Firm*—Alston & Bird LLP

(57) ABSTRACT

A method, apparatus and computer program product are provided for processing of an original batch of documents in which any document of the original batch that fails to comply with the predefined specification is identified to be a non-compliant document. At least one non-compliant batch is then formed that contains the non-compliant documents. The non-compliant batch is distinct from at least one compliant batch that contains any documents that do comply with the pre-defined specification. At least one of the non-compliant and compliant batches advantageously includes a plurality of documents. The complaint batch(es) may then be forwarded for further processing without awaiting rework of the non-compliant documents included in the non-compliant batch (es).

33 Claims, 5 Drawing Sheets

METHODS, APPARATUS AND COMPUTER PROGRAM PRODUCTS FOR PROCESSING CLAIMS

FIELD OF THE INVENTION

The present invention relates generally to methods, apparatus and computer program products for processing documents, such as claims, and, more particularly, to methods, apparatus and computer program products for processing a batch of documents in such a manner that non-compliant documents are separated from the remainder of the documents and do not slow further processing of the compliant documents.

BACKGROUND OF THE INVENTION

Batch processing techniques are utilized to efficiently process multiple documents in a consistent manner. In the health care industry, for example, claims submitted by various medical providers to various payers, such as insurance companies or the like, may be submitted and processed in batches. Similarly, orders, ticket requests or the like may be submitted in batch form to a prospective vendor.

While batch processing may be utilized in a wide variety of circumstances, batch processing provides particular efficiency in instances in which the batches may contain many documents, such as hundreds or thousands of documents. In order to efficiently process the plurality of documents included within a batch, standardized procedures are generally adopted that govern the manner in which the documents will be processed. As such, the documents can generally be processed in batch form in an automated manner.

In some instances, the procedures governing the manner in which batches of documents are to be processed specify that a batch of documents should be rejected if any one of the documents included in the batch does not comply with certain predefined specifications, such as the specifications defining the syntax according to which the documents are to be submitted. As such, a batch containing thousands of documents could be rejected if any one of the documents included in the batch had a syntactical error. Since the entire batch is rejected, numerous documents included in the batch that complies with the predetermined specifications, such as by having the predefined syntax, are rejected along with the non-compliant documents. As will be apparent, the rejection of the entire batch of documents slows down the processing of the documents since the sender must address any syntactical or other errors and then resubmit the entire batch.

By way of example, the submittal of many types of documents by health care providers to various payers is governed by the Health Insurance Portability and Accountability Act (HIPAA) that mandates batch processing of the documents as described below. HIPAA addresses a variety of topics including limitations on exclusions for pre-existing conditions, availability of health insurance coverage for small employers, strengthening of federal health care fraud and abuse laws and administrative simplification and privacy. With respect to administrative simplification, HIPAA was designed to improve the efficiency of the health care system by standardizing the electronic exchange of data and protecting the security and privacy of the health information exchanged thereby.

The administrative simplification component of HIPAA has five (5) elements, each with supporting regulations issued by the U.S. Department of Health and Human Services (HHS). The five elements are: (i) code sets that require the use of standard codes in completing electronic health care transactions, (ii) privacy that restricts the use and disclosure of health information by providers, health plans, health care clearinghouses and their respective business associates, (iii) security that requires reasonable and appropriate administrative, technical and physical safeguards for electronic protected health information, (iv) unique identifiers that require the use of standard unique identifiers for employers, providers, payers and individuals and (v) electronic transactions that require the use of standard electronic formats for eight (8) different health care transactions.

The regulations governing the electronic transactions conducted pursuant to HIPAA require payers and providers to utilize standard formats and content for each of the following transactions:

| Transaction Type | HIPAA Standard |
| --- | --- |
| Eligibility Inquiry and Response | ASC ANSI X12N 270/271 |
| Claim Status Inquiry and Response | ASC ANSI X12N 276/277 |
| Referral/Precertification Request and Response | ASC ANSI X12N 278 |
| Health Plan Premium Payment | ASC ANSI X12N 820 |
| Benefit Enrollment and Maintenance | ASC ANSI X12N 834 |
| Claim Payment and Remittance | ASC ANSI X12N 835 |
| Professional, Institutional, or Dental Health Care Claim/Encounter | ASC ANSI X12N 837 Professional, Institutional, or Dental |
| Pharmacy Claim | NCPDP version 5.1 |

As used in the foregoing table, ASC ANSI represents the Accredited Standards Committee of the American National Standards Institute. ASC ANSI X12, also known merely as X12, is considered to be the primary standard for North American trading using electronic data interchange (EDI). As the above table indicates, the transaction regulations have developed several standards premised upon the X12 standard. For the various types of transactions that have associated standards, the electronic transactions must be conducted according to those standards. While providers may conduct these transactions either electronically or on paper, providers that conduct the transactions electronically must utilize the standard format. Moreover, payers are required to accept the electronic transactions if the electronic transactions are submitted in standard form.

Since not all payers are capable of communicating with providers in accordance with the HIPAA regulations, payers may contract with health care clearinghouses 12 to sit between the providers 10 and the payer 14 so as to translate the messages communicated therebetween, as shown in FIG. 1. In this regard, the providers who transmit electronic transactions according to the HIPAA regulations may direct the electronic transactions to the clearinghouse. The clearinghouse receives the electronic transactions and translates those transactions to a proprietary format utilized by the payer. The translated message is then communicated to the payer. Conversely, messages from the payer intended for the provider are received by the clearinghouse and translated from the proprietary format utilized by the payer to the standard format defined by the HIPAA regulations. The clearinghouse can then provide the translated message to the provider. As also shown in FIG. 1, the clearinghouse need not always receive the electronic transactions directly from the providers, but may, instead, communicate with another clearinghouse or with a billing service, repricing company, switch or other intermediate entity 16 which, in turn, communicates with the provider.

The X12 standard defines the message structure which, in turn, defines the order in which documents and other data are to be presented. In this regard, documents are transmitted pursuant to the X12 standard in packages termed interchanges as shown in FIG. 2. As described below, the documents are organized into various envelopes that provide information relating to the enclosed documents and facilitate proper processing of the documents. As will be known to those skilled in the art and as shown in FIG. 2, each envelope generally includes a header and a corresponding trailer or footer with the header preceding the enclosed documents and the trailer or footer following the enclosed documents.

The outermost envelope is the ISA/IEA envelope 20, also known as the interchange envelope, that isolates one group of transmitted documents from another group. Several dissimilar types of business documents can be included in an interchange envelope with each different type of business document separated from other types of business documents as described below. Among other parameters, each interchange envelope includes a control number that serves to identify the interchange envelope. This control number is sequential between a provider and a payer and can be utilized for statistical control, audit control and to provide error recovery information. As several different versions of the same interchange standard may exist, the interchange envelope also generally defines the particular version of the interchange envelope.

Within the interchange envelope 20 are one or more GS/GE envelopes 22, also known as functional group envelopes. Each GS/GE envelope isolates one group of documents from another. As such, while several dissimilar types of documents can be included within one interchange envelope, each different type of document is contained in a respective GS/GE envelope. Thus, medical claims from several different providers for several different subscribers may be included in one GS/GE envelope, while a functional acknowledgement is included in another GS/GE envelope within the same interchange envelope. Among other parameters, the header and/or footer of the GS/GE envelope identifies the type of documents included within the envelope as well as the version, data dictionary and segment directory that may be utilized to interpret the documents included therein.

Within the GS/GE envelope 22 are one or more ST/SE envelopes 24, also known as transaction set envelopes, that serve to isolate one batch of documents from another. In this regard, several batches of the same type of document can be contained within the same GS/GE envelope with each batch of documents being contained in its own ST/SE envelope. Within a single GS/GE envelope, for example, one ST/SE envelope may include medical claims from one provider while another ST/SE envelope may include medical claims from another provider. The header and/or footer or trailer of the ST/SE envelope may include a control number for audit trail purposes, as well as other parameters.

As a more particular example, the hierarchal structure defined by ASC ANSI X12N 837 for professional, institutional, or dental health care documents is shown in FIG. 3. In this example, a single GS/GE envelope 22 is included within a single ISA/IEA envelope 20, thereby indicating that the file includes one group of similar documents. Within the GS/GE envelope are two ST/SE envelopes 24. Within each ST/SE envelope 26 is a batch 26 of documents submitted by a respective provider such that all of the documents included in a particular ST/SE envelope originate from the same provider. The batch of documents submitted by a respective provider may include documents relating to one or more subscribers or patients. In the first batch included in the first ST/SE envelope, for example, a first provider designated by HL*20 has submitted two documents for a first subscriber designated HL*22 with claims CLM*1 and CLM*2 and a single document for a second subscriber designated CLM*1. By way of another example, the second batch depicted in FIG. 3 was submitted by a second provider designated as HL*20 and includes a single document for a first subscriber denoted HL*22 with claim CLM*1 and two documents for a second subscriber designated HL*22 with claims CLM*1 and CLM*2.

Upon submittal of a batch of documents, the payer 14, or a clearinghouse 12 if the payer is not capable of receiving and properly processing messages formatted according to the X12 standard, reviews the batch of documents to see if the claims are compliant with the predefined specifications set forth by the HIPAA regulations. As described above, if any one or more of the documents included in the batch are non-compliant, such as by having an improper syntax, the entire batch is rejected. In this regard, a rejected batch is returned by the payer, or its clearinghouse, to the provider such that the provider 10 can cure any error, such as any syntactical error, and then resubmit the batch at some point in the future. With reference to the example provided in FIG. 3, an error in the documents submitted for the second subscriber in the first batch would cause the entire first batch to be rejected even though both documents submitted for the first subscriber in that same batch complied with the specifications.

As such, it would be desirable to provide an improved technique for increasing the speed and efficiency with which suitably formatted documents are processed. In this regard, it would be desirable for processing batches of documents in order to permit documents that comply with the predefined specifications to be paid or otherwise further processed in a timely manner without being delayed pending resolution of errors identified in one or more of the other documents.

BRIEF SUMMARY OF THE INVENTION

The present invention relates generally to methods, apparatus and computer program products for processing a batch of documents such that documents that comply with a predefined specification can be forwarded for further processing without being delayed while other documents that have failed to comply with the predefined specifications are reworked. As such, documents that are compliant with the predefined specifications can be more rapidly processed to completion, such as by being paid in the instance of health care documents.

According to one embodiment, a method, apparatus and computer program product for processing an original batch of documents are provided that initially separates the documents of the original batch into a plurality of in-process batches. The documents of the in-process batches are then analyzed to determine if the documents are either non-compliant documents that fail to comply with a predefined specification or compliant documents that do comply with a predefined specification. Based upon this compliance determination, at least one non-compliant batch containing the non-compliant documents and at least one compliant batch containing the compliant documents is formed with at least one of the non-compliant and compliant batches advantageously including a plurality of documents. By permitting the non-compliant and/or compliant batches to include a plurality of documents, the efficiency of the overall process is facilitated by somewhat restricting the number of non-compliant and compliant batches that are generated, such as by generating a single compliant batch including all of the compliant documents and a single non-compliant batch including all of the non-compliant documents in one exemplary embodiment.

According to another embodiment of the present invention, a method, apparatus and computer program product are provided for processing of an original batch of documents in which any document of the original batch that fails to comply with the predefined specification is identified to be a non-compliant document. At least one non-compliant batch is then formed that contains the non-compliant documents. In this regard, the non-compliant batch is distinct from at least one compliant batch that contains any documents that do comply with the predefined specification. Moreover, at least one of the non-compliant and compliant batches advantageously includes a plurality of documents.

In one embodiment, the at least one non-compliant batch is formed by parsing the non-compliant documents from the original batch into the at least one non-compliant batch. Thus, the documents that remain in the original batch constitute the at least one compliant batch. Alternatively, the documents of the original batch may be separated into a plurality of in-process batches. The documents of the in-process batches are then determined to either be non-compliant documents that fail to comply with the predefined specification or compliant documents that do comply with the predefined specification. At least one-non-compliant batch is then formed to include the non-compliant documents and at least one compliant batch is formed to include the compliant documents.

According to either embodiment, a cross-reference to the original batch may be included within each of the non-compliant and compliant batches to provide an audit trail. Once formed, the non-compliant batch(es) may then be returned to the source of the original batch, such as for rework in order to bring the documents of the non-compliant batch(es) into compliance with the predefined specification. Likewise, the at least one compliant batch may be forwarded for further processing, such as for payment in the instance of health care documents submitted by provider to a payer, either directly or via a clearinghouse. By parsing the non-compliant documents of a batch from the compliant documents of the same batch, the further processing of the compliant documents is not delayed pending resolution of the errors denoted with the non-compliant documents, thereby increasing the overall efficiency of the batch processing technique.

Although the foregoing embodiments have primarily been described in terms of a method of operation, corresponding apparatus and computer program products are provided according to other aspects of the present invention. In this regard, the apparatus may include a processing element for performing the various functions set forth above. Correspondingly, the computer program product may include at least one computer-readable storage medium having computer-readable program code portions including various executable portions for performing the various functions set forth above. Regardless of its implementation as a method, apparatus or computer program product, the present invention permits non-compliant documents to be parsed from compliant documents such that compliant documents can be forwarded for further processing without awaiting and incurring the delays associated with the rework of the non-compliant documents. As such, the overall efficiency of the batch processing technique can be increased with the processing and, in some instances, payment of the compliant documents that were initially in a batch that also included one or more non-compliant documents to be completed in a much more timely manner while still permitting the non-compliant documents to be reworked and resubmitted in due course.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
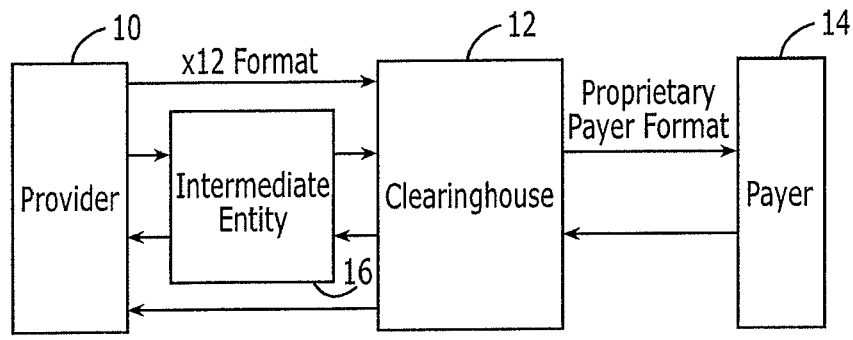
FIG. 1 is a block diagram of a system according to which a provider submits documents for reimbursement to a payer via a clearinghouse.
Figure 2:
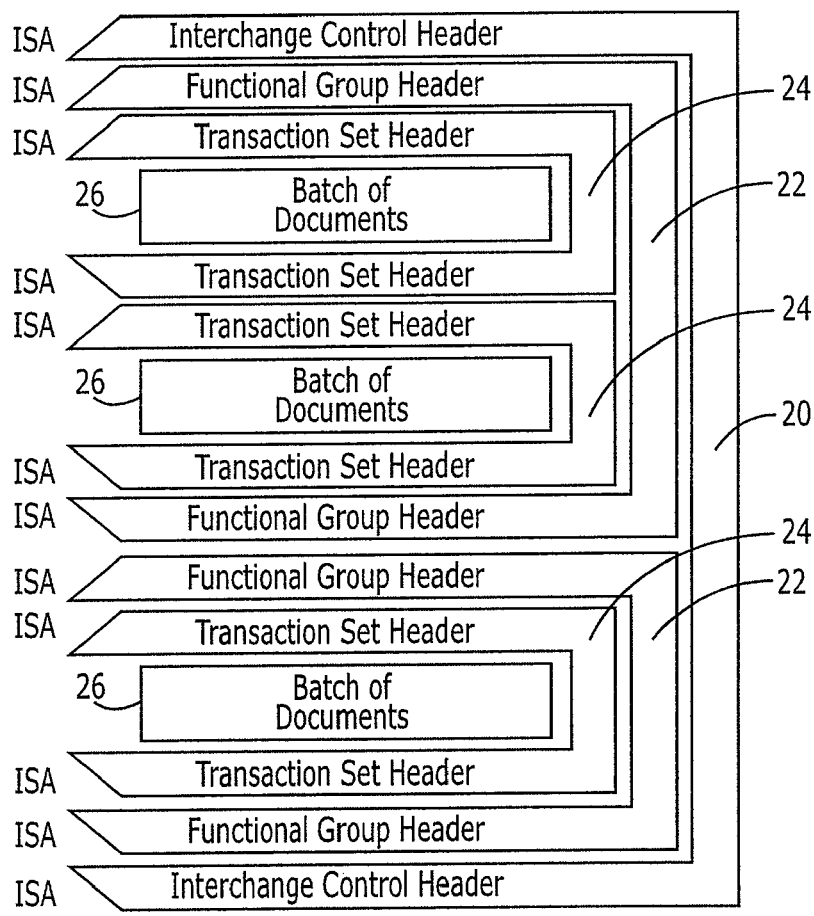
FIG. 2 is a schematic representation of an interchange envelope and its constituent parts as defined by the X12 standard.
Figure 3:
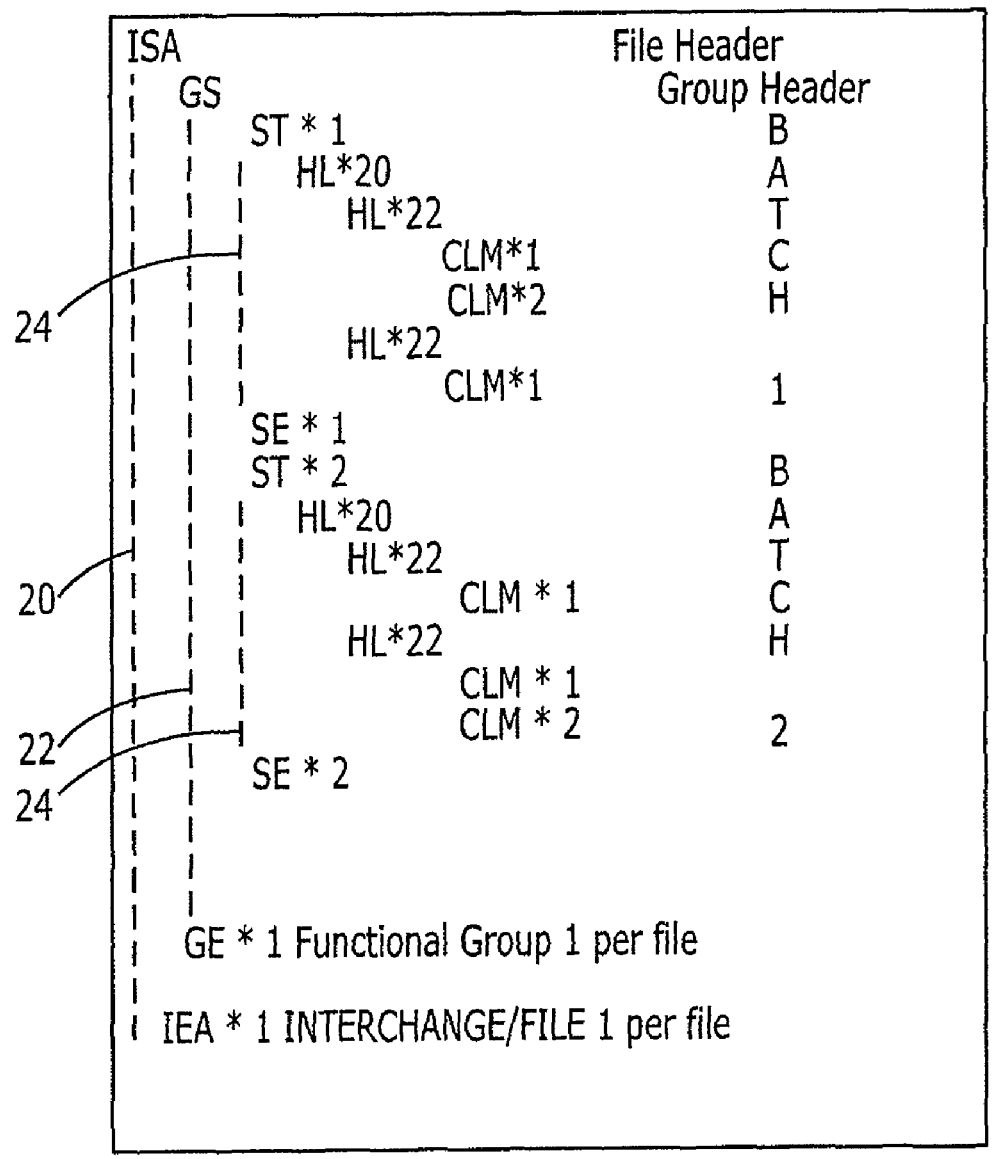
FIG. 3 is a schematic representation of an interchange envelope as defined by the ASC ANSI X12N 837 standard.
Figure 4:
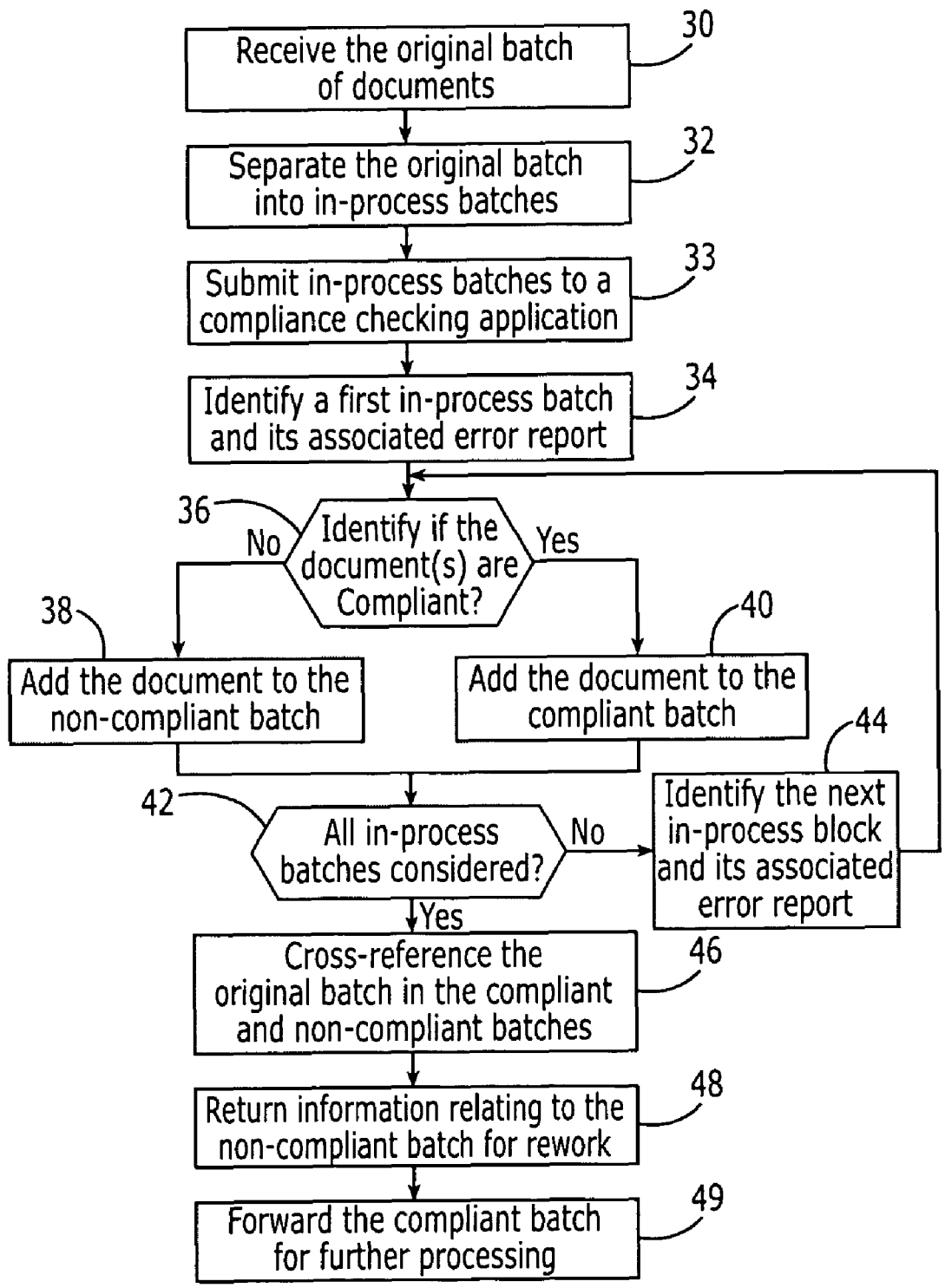
FIG. 4 is a flow chart illustrating the operations performed according to one embodiment to the present invention.

Referring now to FIG. 4, the operations performed for processing an original batch of documents are provided according to one embodiment of the present invention. In one embodiment, the documents are health care claims submitted by a provider 10 to a payer 14 or a clearinghouse 12 and are formatted according to the HIPAA regulations. However, the documents may be any type of document that may be submitted in batch form for processing and which is required to comply with a predefined specification, such as in terms of syntax, format or otherwise. As such, the documents may be orders or ticket requests submitted by a purchaser to a vendor to identify just one other exemplary application.

Figure 5:
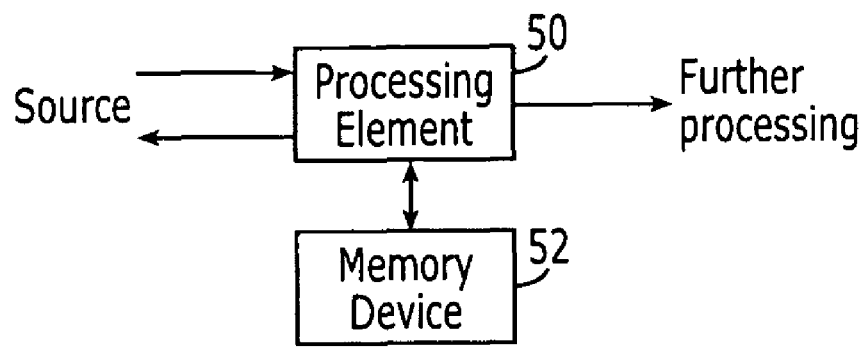
FIG. 5 is a block diagram of an apparatus according to one embodiment of the present invention.

According to the present invention, an original batch of documents is submitted. In the examples in which the documents are health care claims, one or more providers 10 may submit claims to a payer 14, either directly or via a clearinghouse 12, by which the provider seeks payment by the payer for services rendered by the provider to a patient or subscriber. As indicated by step 30 of FIG. 4, the original batch of documents is received, such as by a processing element 50 of the payer 14 or clearinghouse 12. As used herein, the processing element may be comprised of one or more microprocessors, computers, workstations, servers, or other computing devices capable of performing the functions described hereinafter. Although not essential, the processing element generally operates under the control of a computer program that may be stored in a memory device 52 associated with or otherwise accessible by the processing element as shown in FIG. 5 so as to comprise a computer program product.

In one embodiment, the processing element 50 initially separates the documents of the original batch into a plurality of in-process batches. See step 32. While the in-process batches may include various numbers of documents, all of the in-process batches include fewer documents than the original batch. In one embodiment, for example, the in-process batches each include a single document. In this embodiment, the same number of in-process batches is therefore formed as the number of documents in the original batch. A representation of the separation of the documents of the original batch into a plurality of in-process batches, each including in a single document, is depicted on the left hand side of FIG. 6.

Starting with a first one of the in-process batches as shown in step 34, the processing element 50 then identifies if the documents of the in-process batches are either non-compliant documents that fail to comply with predefined specification or compliant documents that do comply with the predefined specification. See step 36. Depending upon the type of document that is being processed, a wide variety of predefined specifications may be referenced by the processing element to determine the compliance of the documents. In the embodiment in which a batch of health care claims are being processed, the predefined specification is generally defined by the HIPAA regulations governing the particular type of claim. For example, the predefined specification may be defined by ASC ANSI X12N 837. Among other things, ASC ANSI X12N 837 defines the syntax and/or format of professional, institutional or dental claims. Thus, the claims of this embodiment that comply with ASC ANSI X12N 837 are considered to be compliant claims, while those that do not comply to ASC ANSI X12N 837 in some fashion, such as by having a syntax error, are identified to be non-compliant claims.

While the determination of whether or not the individual documents are compliant may be made in various manners, the in-process batches may be submitted to and processed by a conventional compliance checking application or component of a third party translation product, as noted by step 33. By way of example but not of limitation, conventional translation software products that include compliance checking applications include the Gentran Integration Suite that is commercially available from Sterling Commerce, Inc. and the Inovis Trusted Link Enterprise that is commercially available from Inovis, Inc. As known to those skilled in the art, a conventional compliance checking application generally issues an error report that, among other things, identifies the document(s) that are non-compliant relative to the predefined specification. Beginning with the first in-process batch, the processing element 50 can therefore identify if the documents of the in-process batch are compliant or non-compliant based upon the error report for the respective in-process batch that has been provided by the compliance checking application.

Based upon the foregoing identification of non-compliant documents, the processing element 50 forms at least one non-compliant batch containing the non-compliant documents. See step 38. Similarly based upon the foregoing compliance determination, the processing element forms at least one compliant batch containing the compliant documents. See step 40. The processing element may form two or more non-compliant batches and/or two or more compliant batches with the numbers of non-compliant and compliant batches either being the same or different. In one advantageous embodiment, however, the processing element forms a single non-compliant batch containing all of the non-compliant documents and a single compliant batch containing all of the compliant documents. In this regard, the right-hand side of FIG. 6 also illustrates the consolidation of all of the compliant documents (Claims 1 and 3) into a single compliant batch and all of the non-compliant claims (Claims 2 and 4) into a single non-compliant batch. By forming only one or a limited number of non-compliant and compliant batches, at least one of the non-compliant and compliant batches advantageously includes a plurality of documents so as to facilitate the efficient processing of the batched documents. In this regard, the consolidation of the non-compliant and compliant documents into one or a limited number of non-compliant and compliant batches avoids unnecessary usage of processing system resources, thereby improving the efficiency and decreasing the processing time relative to instances in which a larger number of non-compliant and/or compliant batches would be created.

The analysis of the in-process batching and the identification of whether the documents included in the in-process batches are compliant generally continues until all in-process batches and, as a result, all documents have been considered. See steps 42 and 44. In addition to merely sorting the non-compliant and compliant documents into the non-compliant and compliant batches, respectively, the processing element 50 can associate additional information with the respective batches. In this regard, a cross-reference to the original batch in which the documents were received may be associated with the non-compliant and compliant batches. See step 46. Thus, the cross-reference that may be included in the non-compliant and compliant batches provides an audit trail should it ever be desirable in the future to determine the origin of the documents in the non-compliant and compliant batches.

Once the non-compliant and compliant batches have been formed, the processing element 50 can return the non-compliant batch(es) or, more typically, information relating to the non-compliant batch(es), such as an error report that identifies the errors and permits the errors to be corrected to the source of the original batch or to some other predesignated recipient. See step 48. In the embodiment in which the documents are health care claims, the processing element can return an error report relating to the non-compliant batch(es) to the provider(s) for rework of the non-compliant documents. In this regard, the provider(s) can reformat the non-compliant documents or otherwise correct the syntactical or other errors. Thereafter, the provider(s) can resubmit the reworked documents in a different batch for reconsideration and further processing. The processing element can also forward the compliant batch(es) for further processing as shown in step 49. In instances in which the documents are health care claims submitted to a clearinghouse 12 that processes the claims on behalf of a payer 14, the clearinghouse can forward the compliant batch(es) to the payer for payment or other processing. Advantageously, the processing element can forward the compliant batch(es) concurrent with or otherwise while non-compliant batch(es) are returned to the source of the original batch. As such, the compliant documents can be further processed without awaiting rework of the non-compliant documents, thereby increasing the overall efficiency with which the method, apparatus and computer program product of the present invention process a batch of documents.

As described above, the documents of the original batch were initially separated into a plurality of in-process batches as shown in step 32. However, other embodiments of the present invention need not separate the documents of the original batch into a plurality of in-process batches. Instead, the original batch of documents may be analyzed so that the non-compliant documents included within the original batch are identified. While the identification of the non-compliant documents may be made in various fashions, the original batch of documents has oftentimes been previously processed by a conventional compliance checking application or component of a third party translation product. As noted above and as known to those skilled in the art, a conventional compliance checking application generally issues an error report that, among other things, identifies or otherwise provides an indication of the documents that are non-compliant relative to the predefined specification.

Figure 7:
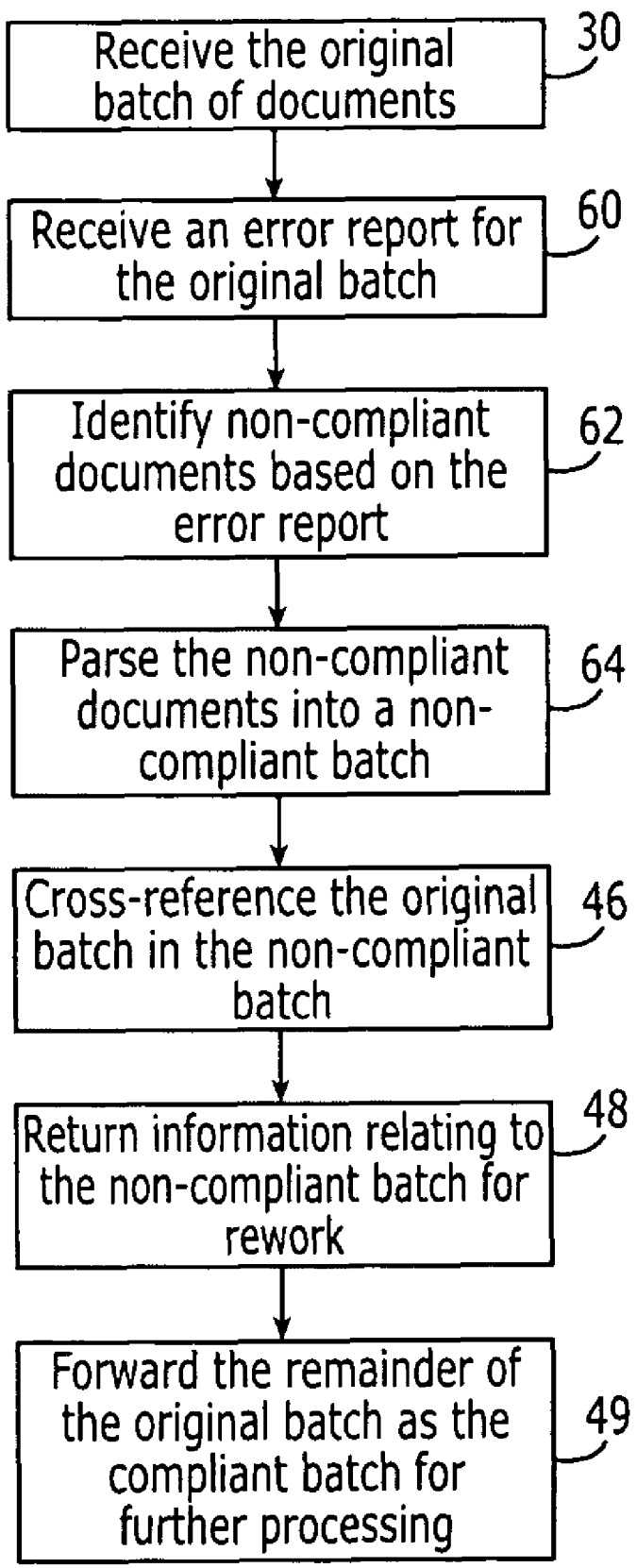
FIG. 7 is a flow chart illustrating the operations performed according to another embodiment of the present invention.

According to this embodiment of the present invention that is depicted in FIG. 7 in which steps that are in common with FIG. 4 are designated with the same number, the processing element 50 receives not only the original batch of documents, but also an error report for the original batch of documents that has typically been generated by a compliance checking application. See steps 30 and 60. The processing element may then identify the documents from the original batch that are non-compliant based upon the error report. See step 62. The non-compliant documents that are identified are then parsed from the original batch into at least one non-compliant batch. See step 64. Following the parsing of all non-compliant documents into at least one non-compliant batch, the documents that remain in the original batch effectively comprise the compliant batch. Information regarding the non-compliant batch(es), such as an error report, may then be returned for rework as noted in step 48, while the compliant batch is forwarded for further processing, as described above and as shown in step 49. Although the non-compliant documents are identified and parsed in a different manner, this embodiment of the present invention also affords the same advantages that non-compliant batch(es) may be submitted for rework while compliant batch(es) are concurrently forwarded for further processing, thereby increasing the overall efficiency of the batch processing process.

As will be apparent to those skilled in the art, the documents can undergo additional processing both before and after the parsing of the documents of the original batch into non-compliant and compliant batches of documents. In one embodiment in which health care claims are submitted for payment and are to be formatted in accordance with the ASC ANSI X12N 837 standard, the processing element 50 may initially validate the submitter and the payer and the relationship therebetween. If the submitter, the payer and/or the relationship therebetween is invalid, an error message may be displayed. Alternatively, if the submitter, the payer and the relationship therebetween is valid, the ISA/IEA envelope and the GS/GE enveloped may be analyzed for compliance with the predefined specifications. If the ISA/IEA and/or GS/GE envelope are not in compliance, a message may be transmitted indicating the entire batch is rejected. If, however, the ISA/IEA envelope and the GS/GE envelope are determined to be valid and in compliance, the ST/SE envelope and its contents, i.e., the claims, may be analyzed to determine their compliance with the predefined specifications. If their compliance is validated, a positive report may be generated and the batch may be forwarded for further processing, such as for payment by the payer. If, however, any aspect of the ST/SE envelope is not in compliance, the information regarding the provider may initially be examined to determine if an error exists. If an error exists in the information associated with the provider, all claims relating to that provider are removed from the batch and a message indicating that either all or a portion of the batch is being rejected may be created and transmitted. If, however, the information relating to the provider is acceptable, the information relating to the subscribers may then be analyzed to determine if that information is also compliant. If the information regarding one or more of the subscribers is not compliant, all documents associated with the non-compliant subscriber(s) may be removed and a corresponding message indicating that either all or a portion of the batch is being rejected is created and transmitted. If, however, the information relating to the subscribers is also valid and compliant, the individual claims are analyzed as described above in conjunction with FIGS. 4, 6 and 7 to form the non-compliant and compliant batches with the associated cross-references to the original batch. While one embodiment of the method, apparatus and computer program product of the present invention provides a number of other checks and verifications as described above, the method, apparatus and computer program products of the present invention need not include any or all of these checks and verifications and may instead include different checks and verifications or none at all, as so desired.

According to one aspect of the present invention, the processing element 50 generally operates under control of a computer program product as also noted above. The computer program product for performing the methods of embodiments of the present invention includes a computer-readable storage medium, such as the memory device 52 associated with the processing element, and computer-readable program code portions, such as a series of computer instructions, embodied in the computer-readable storage medium.

Figure 6:
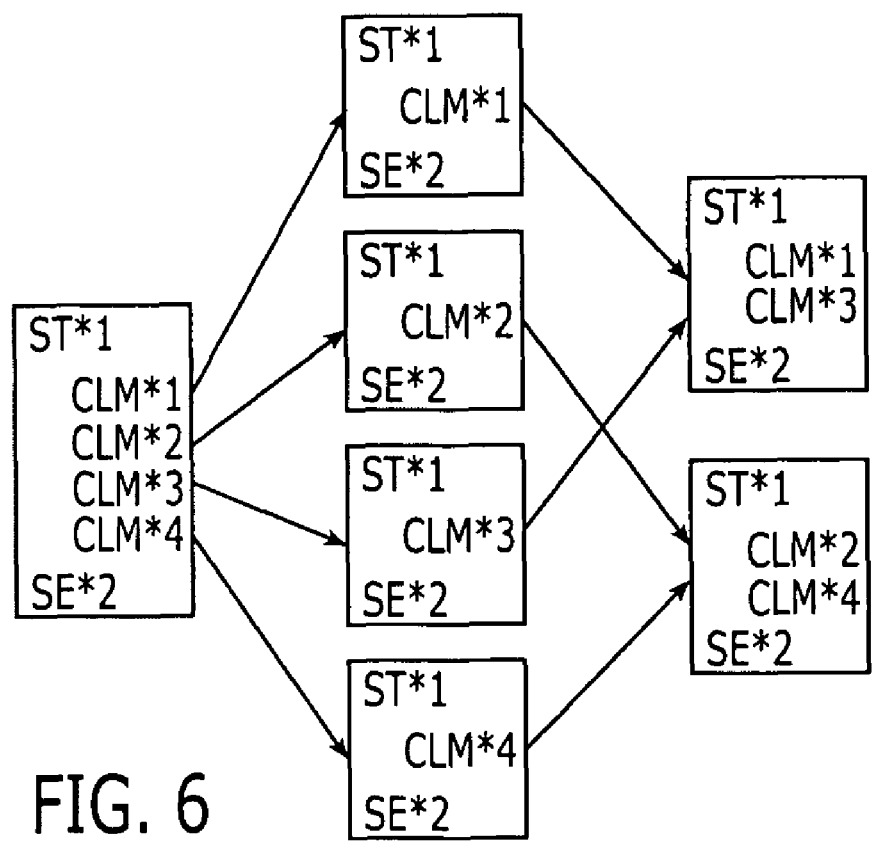
FIG. 6 is a schematic representation of the batch processing provided according to one embodiment of the present invention.

In this regard, FIGS. 4, 6 and 7 are control flow diagrams of methods and program products according to the invention. It will be understood that each block or step of the control flow diagrams, and combinations of blocks in the control flow diagrams, can be implemented by computer program instructions. These computer program instructions may be loaded onto the processing element 50, such as a computer or other programmable apparatus, to produce a machine, such that the instructions which execute on the processing element create means for implementing the functions specified in the block(s) or step(s) of the control flow diagrams. These computer program instructions may also be stored in a computer-readable memory 52 that can direct the processing element to function in a particular manner, such that the instructions stored in the computer-readable memory produce an article of manufacture including instruction means which implement the function specified in the block(s) or step(s) of the control flow diagrams. The computer program instructions may also be loaded onto the processing element to cause a series of operational steps to be performed on the processing element to produce a computer implemented process such that the instructions which execute on the processing element provide steps for implementing the functions specified in the block(s) or step(s) of the control flow diagrams.

Accordingly, blocks or steps of the control flow diagrams support combinations of means for performing the specified functions, combinations of steps for performing the specified functions and program instruction means for performing the specified functions. It will also be understood that each block or step of the control flow diagrams, and combinations of blocks or steps in the control flow diagrams, can be implemented by special purpose hardware-based computer systems which perform the specified functions or steps, or combinations of special purpose hardware and computer instructions.

As described above, the method, apparatus and computer program product of the present invention permit non-compliant documents to be parsed from the compliant documents included in the same original batch. As such, the documents that do comply may be forwarded for further processing without awaiting and therefore being delayed by rework associated with the non-compliant documents. Accordingly, the advantages offered by batch processing may be enjoyed, while avoiding the inefficiencies created by conventional techniques in which an entire batch of documents was rejected in instances in which only a subset of the documents in the batch were actually non-compliant.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended documents. Although specific terms are employed herein, they are used in a generic and descriptive sense only and not for purposes of limitation.

The invention claimed is:

1. A method of processing an original batch of documents, the method comprising:

separating the documents of the original batch into a plurality of in-process batches without consideration of compliance of the in-process batches' documents;

following the separating of the documents into the in-process batches, identifying each document of the in-process batches either as a non-compliant document that fails to comply with a predefined specification or as a compliant document that complies with the predefined specification;

forming at least one non-compliant batch distinct from the original batch and containing non-compliant documents based upon the identification of each of the in-process batches' documents as being either compliant or non-compliant;

forming at least one compliant batch containing compliant documents based upon the identification of each of the in-process batches' documents as being either compliant or non-compliant, wherein the at least one compliant batch differs from the in-process batches in terms of documents included therein, in that the at least one compliant batch includes compliant documents from at least two in-process batches;

providing an output based upon at least one of the at least one non-compliant batch and the at least one compliant batch; and forwarding the at least one compliant batch for further processing, and concurrently submitting the at least one non-compliant batch to an external source of the original batch to be brought in compliance with the predefined specification.

2. The method according to claim 1 wherein forming the at least one non-compliant batch and the at least one compliant batch comprises forming the at least one non-compliant batch and the at least one compliant batch such that at least one of the at least one non-compliant batch and of the at least one compliant batch comprises a more than one document.

3. The method according to claim 1 wherein providing the output comprises returning information relating to the at least one non-compliant batch to the external source of the original batch.

4. The method according to claim 3, wherein returning information relating to the at least one non-compliant batch to the external source of the original batch comprises returning an error report identifying errors in the at least one non-compliant batch.

5. The method according to claim 1 wherein providing the output comprises forwarding the at least one compliant batch for further processing.

6. The method according to claim 1 wherein forming the at least one non-compliant batch and the at least one compliant batch comprises associating a cross-reference to the original batch with each of the at least one non-compliant batch and of the at least one compliant batch.

7. The method according to claim 6, wherein associating a cross-reference to the original batch with each of the at least one non-compliant batch and the at least one compliant batch comprises associating information with each of the at least one non-compliant batch and of the at least one compliant batch to determine an origin of each of the non-compliant documents and of the compliant documents.

8. The method according to claim 1, wherein forming the at least one non-compliant batch containing the non-compliant documents and the at least one compliant batch containing the compliant documents comprises forming one non-compliant batch containing all the documents of the original batch that are non-compliant and one compliant batch containing all the documents of the original batch that are compliant.

9. An apparatus for processing an original batch of documents, the apparatus comprising:

a processor configured to:

receive an original batch comprising a plurality of documents;

separate the documents of the original batch into a plurality of in-process batches without consideration of compliance of the in-process batches' documents;

identify, following separation of the documents into the plurality of the in-process batches, each of the in-process batches' documents either as a non-compliant document that fails to comply with a predefined specification or as a compliant document that complies with the predefined specification;

form at least one non-compliant batch distinct from the original batch and containing non-compliant documents based upon the identification of each of the in-process batches' documents as being either compliant or non-compliant;

form at least one compliant batch containing compliant documents based upon the identification of each of the in-process batches' documents as being either compliant or non-compliant, wherein the at least one compliant batch differs from the in-process batches in terms of documents included therein, in that the at least one compliant batch includes compliant documents from at least two in-process batches; and forward the at least one compliant batch for further processing, and concurrently submit the at least one non-compliant batch to an external source of the original batch to be brought in compliance with the predefined specification.

10. The apparatus according to claim 9 wherein said processor is configured to form the at least one non-compliant batch and the at least one compliant batch by forming the at least one non-compliant batch and the at least one compliant batch such that at least one of the at least one non-compliant batch and of the at least one compliant batch comprises a more than one document.

11. The apparatus according to claim 9 wherein said processor is further configured to return information relating to the at least one non-compliant batch to the external source of the original batch.

12. The apparatus according to claim 9 wherein said processor is further configured to forward the at least one compliant batch for further processing.

13. The apparatus according to claim 9 wherein said processor is configured to form the at least one non-compliant batch and the at least one compliant batch so as to include a cross-reference to the original batch with each of the at least one non-compliant batch and of the at least one compliant batch.

14. A computer program product for processing an original batch of documents, the computer program product comprising at least one computer-readable storage medium having computer-readable program code portions stored therein, the computer-readable program code portions comprising:
   a first executable portion capable of receiving an original batch comprising a plurality of documents;
   a second executable portion capable of separating the documents of the original batch into a plurality of in-process batches without consideration of compliance of the in-process batches' documents;
   a third executable portion capable of identifying, following separation of the documents into the plurality of the in-process batches, each document of the in-process batches either as a non-compliant document that fails to comply with a predefined specification or as a compliant document that complies with the predefined specification;
   a fourth executable portion capable of forming:
      at least one non-compliant batch distinct from the original batch and containing non-compliant documents based upon the identification of each of the in-process batches' documents as being either compliant or non-compliant; and
      at least one compliant batch containing compliant documents based upon the identification of each of the in-process batches' documents as being either compliant or non-compliant, wherein the at least one compliant batch differs from the in-process batches in terms of documents included therein, in that the at least one compliant batch includes compliant documents from at least two in-process batches; and
   a fifth executable portion capable of forwarding the at least one compliant batch for further processing, and concurrently submitting the at least one non-compliant batch to an external source of the original batch to be brought in compliance with the predefined specification.

15. The computer program product according to claim 14 wherein said fourth executable portion is capable of forming the at least one non-compliant batch and the at least one compliant batch such that at least one of the at least one non-compliant batch and of at least one compliant batch comprises a more than one document.

16. The computer program product according to claim 14 further comprising a fifth executable portion capable of returning information relating to the at least one non-compliant batch to the external source of the original batch.

17. The computer program product according to claim 14 further comprising a fifth executable portion capable of forwarding the at least one compliant batch for further processing.

18. The computer program product according to claim 14 wherein said fourth executable portion is capable of forming the at least one non-compliant batch and at least one compliant batch so as to include a cross-reference to the original batch with each of the at least one non-compliant batch and of the at least one compliant batch.

19. A method of processing an original batch of documents, the method comprising:
   separating the documents of the original batch into a plurality of in-process batches;
   receiving an indication of any of the documents of the in-process batches that fail to comply with a predefined specification and identifying any such documents to be non-compliant documents;
   forming at least one non-compliant batch containing the non-compliant documents, wherein the at least one non-compliant batch is distinct from the original batch;
   forming at least one compliant batch that contains any of the documents that do comply with the predefined specification, wherein at least one of the at least one non-compliant batch and of the at least one compliant batch comprises a plurality of documents;
   returning information relating to the at least one non-compliant batch to an external source of the original batch, wherein the external source comprises a different entity than that which processes the original batch of the documents, and wherein the external source processes the returned information to bring the at least one non-compliant batch in compliance with the predetermined specification;
   following processing of the at least one non-compliant batch, receiving the processed at least one non-compliant batch that was brought in compliance; and
   forwarding the processed at least one non-compliant batch brought in compliance for further processing.

20. The method according to claim 19 wherein forming the at least one non-compliant batch comprises parsing the non-compliant documents from the original batch in-process batches into the at least one non-compliant batch such that the documents that remain in the in-process batches are consolidated into the at least one compliant batch.

21. The method according to claim 19, wherein forming the at least one non-compliant batch comprises forming at least one non-compliant batch containing the non-compliant documents and at least one compliant batch containing the compliant documents based upon the compliance determination.

22. The method according to claim 19 further comprising forwarding the at least one compliant batch for further processing.

23. The method according to claim 19, wherein processing the returned information to bring the at least one non-compliant batch in compliance with the predetermined specification comprises at least one of reformatting the at least one non-compliant document or correcting syntactical errors.

24. The method according to claim 19, wherein returning information relating to the at least one non-compliant batch to an external source of the original batch comprises returning an error report identifying errors in the at least one non-compliant batch.

25. The method according to claim 19, wherein forming the at least one compliant batch comprises forming the least one compliant batch comprising all documents remaining in the in-process batches following the formation of the at least one non-compliant batch.

26. An apparatus for processing an original batch of documents, the apparatus comprising:
   a processor configured to:
      separate the documents of the original batch into a plurality of in-process batches;
      receive an indication of any of the documents of the in-process batches that fail to comply with a predefined specification; and
      identify any such documents to be non-compliant documents; and
      thereafter form at least one non-compliant batch containing the non-compliant documents, wherein the processor is configured to form the at least one non-compliant batch to be distinct from the original batch and be distinct from at least one compliant batch that contains any documents that comply with the predefined specification, and wherein at least one of the at least one non-compliant batch and of the at least one compliant batch comprises a more than one document;

wherein the processor is further configured to return information relating to the at least one non-compliant batch to an external source of the original batch, wherein the external source comprises a different entity than that which processes the original batch of the documents, and wherein the external source processes the returned information to bring the at least one non-compliant batch in compliance with the predetermined specification;

receive the processed at least one non-compliant batch that was brought in compliance, following processing of the at least non-compliant batch; and forward the processed at least one non-compliant batch brought in compliance for further processing.

27. The apparatus according to claim 26 wherein said processor is configured to form the at least one non-compliant batch by being configured to parse the non-compliant documents from the in-process batches into the at least one non-compliant batch such that the documents that remain in the in-process batches are consolidated into the at least one compliant batch.

28. The apparatus according to claim 26, wherein said processor is configured to form the at least one non-compliant batch by being configured to form the at least one non-compliant batch containing the non-compliant documents and the at least one compliant batch containing the compliant documents based upon the compliance determination.

29. The apparatus according to claim 26 wherein said processor is further capable of forwarding the at least one compliant batch for further processing.

30. A computer program product for processing an original batch of documents, the computer program product comprising at least one computer-readable storage medium having computer-readable program code portions stored therein, the computer-readable program code portions comprising:

a first executable portion capable of separating the documents of the original batch into a plurality of in-process batches;

a second executable portion capable of receiving an indication of any of the documents of the in-process batches that fail to comply with a predefined specification and identifying any such documents to be non-compliant documents;

a third executable portion capable of forming at least one non-compliant batch containing the non-compliant documents, wherein said third executable portion is capable of forming:

the at least one non-compliant batch to be distinct from the original batch, and at least one compliant batch that contains any of the documents that do comply with the predefined specification, wherein at least one of the at least one non-compliant batch and of the at least one compliant batch comprises more than one document;

a fourth executable portion configured to return information relating to the at least one non-compliant batch to an external source of the original batch, wherein the external source comprises a different entity than that which processes the original batch of the documents, and wherein the external source processes the returned information to bring the at least one non-compliant batch in compliance with the predetermined specification;

a fifth executable portion capable of receiving the processed at least one non-compliant batch that was brought in compliance, following processing of the at least one non-compliant batch; and a sixth executable portion capable of forwarding the processed at least one non-compliant batch brought in compliance for further processing.

31. The computer program product according to claim 30, wherein said third executable portion is capable of forming the at least one non-compliant batch by being configured to parse the non-compliant documents from the in-process batches into the at least one non-compliant batch such that the documents that remain in the in-process batches are consolidated into the at least one compliant batch.

32. The computer program product according to claim 30, wherein said third executable portion is capable of forming the at least one non-compliant batch by forming the at least one non-compliant batch containing the non-compliant documents and the at least one compliant batch containing the compliant documents based upon the compliance determination.

33. The computer program product according to claim 30 further comprising a seventh executable portion capable of forwarding the at least one compliant batch for further processing.

* * * * *

UNITED STATES PATENT AND TRADEMARK OFFICE
CERTIFICATE OF CORRECTION

| | | |
|---|---|---|
| PATENT NO. | : 7,730,066 B2 | Page 1 of 1 |
| APPLICATION NO. | : 10/933864 | |
| DATED | : June 1, 2010 | |
| INVENTOR(S) | : Bonham et al. | |

It is certified that error appears in the above-identified patent and that said Letters Patent is hereby corrected as shown below:

On the Title page,

Item (57), ABSTRACT,

Line 11, "complaint" should read --compliant--.

Column 14,

Line 28, cancel "original batch".

Signed and Sealed this
Twenty-third Day of August, 2011

David J. Kappos
*Director of the United States Patent and Trademark Office*